United States Patent
Bartel (12)

(10) Patent No.: US 6,191,561 B1
(45) Date of Patent: Feb. 20, 2001

(54) VARIABLE OUTPUT ROTARY POWER GENERATOR

(75) Inventor: Roger P. Bartel, Houston, TX (US)

(73) Assignee: Dresser Industries, Inc., Dallas, TX (US)

(*) Notice: Under 35 U.S.C. 154(b), the term of this patent shall be extended for 0 days.

(21) Appl. No.: 09/231,739

(22) Filed: Jan. 15, 1999

Related U.S. Application Data

(60) Provisional application No. 60/071,611, filed on Jan. 16, 1998.

(51) Int. Cl.[7] .................................................. H02P 9/40
(52) U.S. Cl. ........................................ 322/51; 322/49
(58) Field of Search .............................. 310/191, 209, 310/103, 114, 105; 322/49, 51

(56) References Cited

U.S. PATENT DOCUMENTS

| | | |
|---|---|---|
| 3,525,005 | 8/1970 | Beyers . |
| 3,713,015 | 1/1973 | Frister . |
| 3,970,877 | 7/1976 | Russell et al. ................... 310/8.3 |
| 4,305,031 | 12/1981 | Wharton . |
| 4,396,071 | 8/1983 | Stephens ........................ 175/50 |
| 4,491,738 | 1/1985 | Kamp ............................ 290/43 |
| 4,515,225 | 5/1985 | Dailey ........................... 175/40 |
| 4,625,582 | 12/1986 | Kiryu . |
| 4,641,080 | 2/1987 | Glennon et al. ................ 322/49 |
| 4,654,577 | 3/1987 | Howard ......................... 322/28 |
| 4,766,362 | 8/1988 | Sadvary ......................... 322/50 |
| 5,260,642 | 11/1993 | Huss ............................. 322/51 |
| 5,821,658 | 10/1998 | Boggs ............................ 310/105 |

OTHER PUBLICATIONS

HD Systems, Inc., "Harmonic Drive Gearing, Precision Gearing & Motion Control, Cup Type Component Sets & Housed Units, CSF Series Product and Designer's Guide," 1996.

Harmonic Drive Technologies, "HDC Cup Component Gear Set Selection Guide," 1993.

*Primary Examiner*—Clayton LaBalle
*Assistant Examiner*—Peter Medley
(74) *Attorney, Agent, or Firm*—Cox & Smith Incorporated

(57) ABSTRACT

The present invention is directed to a downhole apparatus for quickly generating and regulating variable output electric power by varying the alignment of a pair of axially adjacent permanent magnets rotating within an armature having electrically conductive windings. Each of the permanent magnets comprises a plurality of permanent magnetic segments having circumferentially alternating magnetizations. One of the permanent magnets is fixed to the drive shaft, and the other permanent magnet is movably mounted on the drive shaft to enable the alignment or misalignment, as desired, of the magnetizations of the respective magnetic segments on the pair of permanent magnets. When the magnetizations are completely aligned, the maximum electrical power is generated in the windings of the main armature; conversely, when the magnetizations are completely misaligned, zero electrical power is generated. Thus, the output power is regulated by varying the alignment of the pair of permanent magnets, which is accomplished with a drag torque generator which creates a drag torque that is transmitted to the movable permanent magnet by a torque converter.

17 Claims, 6 Drawing Sheets

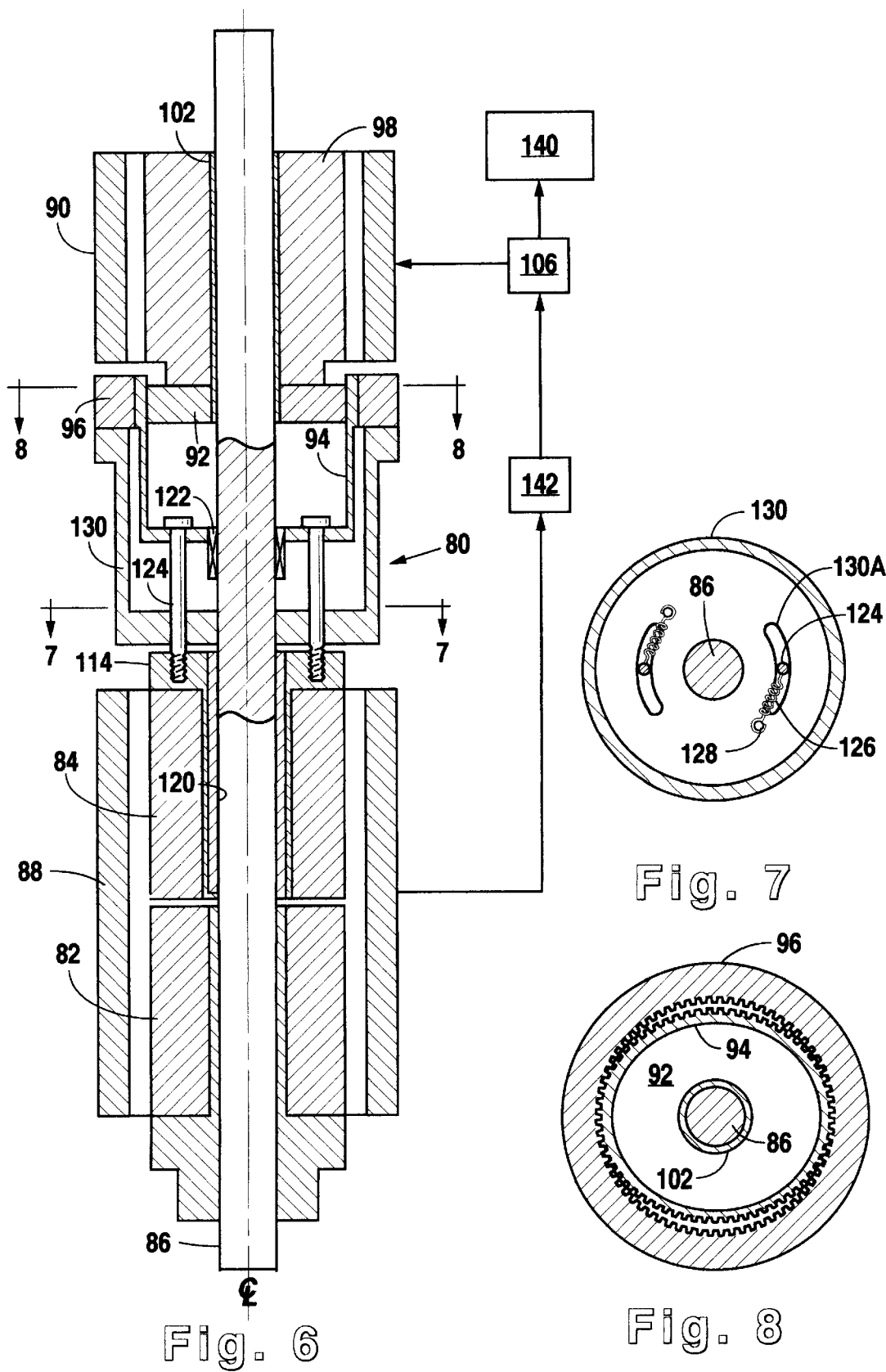

VARIABLE OUTPUT ROTARY POWER GENERATOR

This application claims priority from U.S. provisional application Ser. No. 60/071,611 filed Jan. 16, 1998.

BACKGROUND OF THE INVENTION

1. Field of the Invention

This invention relates generally to an apparatus for generating electric power downhole within an earth borehole. More specifically, this invention relates to a downhole apparatus for generating variable electric output by varying the alignment of permanent magnets rotating within an armature having electrically conductive windings.

2. Description of the Related Art

In the field of petroleum well drilling and logging, recent advancements in drilling and logging technology have produced tools that require increasingly higher levels of electric energy downhole. Moreover, for many modern drilling and logging systems, the electric energy requirements vary over a wide dynamic range of system operating conditions. Thus, during certain operating conditions, such systems require reduced electric energy, and the dissipation of any excess electric energy must not result in destructive effects within the generator and/or the associated regulating electronics. Additionally, for a generator driven by a rotating shaft from a conventional mud-powered turbine, the rotational speed of the input shaft ("input RPM") often varies over a wide range, which, for a conventional permanent magnet generator, presents significant difficulties with respect to the dissipation of excess energy because such dissipation must occur in a downhole environment that typically involves elevated ambient temperatures.

Before the present invention, existing downhole electric generators were not directed to meeting these variable energy requirements. For example, U.S. Pat. No. 3,970,877, issued to Russell et al. on Jul. 20, 1976, discloses a method for generating downhole electric energy using a means responsive to turbulence in the drilling mud flow to convert vibratory motion into an electrical output. However, the method of the '877 patent is directed to low-power generation rather than high-power generation. Another drawback of the method of the '877 patent is that it requires electronic devices to rectify and smooth the electrical output, which is initially in the form of relatively high-voltage pulses.

U.S. Pat. No. 4,396,071, issued to Stephens on Aug. 2, 1983, discloses an apparatus for regulating the electrical output produced by a conventional mud-powered turbine by means of a by-pass valve to control the amount of mud flow passing through the turbine. Although the '071 apparatus is directed to providing relatively constant electrical output to meet the electrical demands of a downhole measurement while drilling system, the '071 apparatus attempts to accomplish that goal indirectly by controlling the input RPM to the electrical generator rather than directly controlling the electrical output of the generator regardless of the input RPM, which would be more desirable. Additionally, the by-pass valve of the '071 apparatus would suffer from the destructive effects of erosion that are frequently encountered in the use of typical drilling fluids (muds). Similarly, U.S. Pat. No. 4,491,738, issued to Kamp on Jan. 1, 1985, discloses a machine for generating electrical energy by controlling drilling fluid dynamics, preferably in response to fluid pressure changes created by a conventional mud-pulse telemetry system, to move a reciprocating anchor comprising a plurality of magnets inside a stator, and U.S. Pat. No. 4,515,225, issued to Dailey on May 7, 1985, discloses an apparatus in which a fluid separate from the drilling mud is used to activate an electrical generator. Again, however, the '738 and '225 machines are not directed to meeting the aforementioned variable electrical requirements.

It would, therefore, be a significant advancement in the art to provide an improved downhole apparatus for generating variable electrical output over a wide range of input RPM and downhole system electrical requirements.

SUMMARY OF THE INVENTION

Accordingly, this invention is directed to a downhole apparatus for generating and regulating variable electric output for a downhole drilling and/or logging system (generally referred to herein as a "system" or "downhole system"). The present invention accomplishes that objective by providing a pair of axially adjacent permanent magnets, each of which comprises a plurality of permanent magnetic segments having circumferentially alternating magnetizations, on a drive shaft which is connected to a rotating shaft (such as a conventional mud-powered turbine) and thereby rotated within a fixed main armature having windings for carrying the generated electrical output. One of the permanent magnets is fixed to the drive shaft, and the other permanent magnet is movably mounted on the drive shaft to enable the alignment or misalignment, as desired, of the magnetizations of the respective magnetic segments on the pair of permanent magnets. When the magnetizations are completely aligned, the maximum electrical output is generated in the windings of the main armature; conversely, when the magnetizations are completely misaligned, zero electrical output is generated. The present invention thus avoids the aforementioned problem concerning dissipation of excess energy by not generating excess energy. Depending on the electrical requirements of the downhole system, the electrical output of this invention may be tailored to meet current, voltage, or power specifications, as desired. A typical requirement is to provide relatively constant voltage regardless of the input RPM of the rotating drive shaft.

To accomplish this electric energy regulation, the present invention includes a drag torque generator which creates a drag torque that is transmitted to the movable permanent magnet by a torque converter (reduction gearing). The drag torque generator preferably comprises an electrically conductive rotor rotatably mounted to the drive shaft, which rotates inside a fixed drag armature having windings for carrying an electrical control current. A controller, which is responsive to the generated output, controls the electrical control current in the windings of the drag armature. The electrical control current produces a first magnetic field, which induces an eddy current in the electrically conductive rotor. In turn, the induced eddy current produces a second magnetic field that opposes the first magnetic field thereby creating a drag torque on the rotor. The rotor is connected to the torque converter, which converts the drag torque into a control torque to properly position the movable magnet and thereby regulate the amount of electrical output generated in the windings of the main armature.

BRIEF DESCRIPTION OF THE DRAWINGS

This invention may best be understood by reference to the following drawings:

FIG. 6 is a schematic axial cross-sectional view of an alternative embodiment of an electric generator in accordance with the present invention.

FIG. 7 is a schematic cross-sectional view taken in direction 7—7 of FIG. 6 showing a biasing mechanism of the electric generator of FIG. 6.

FIG. 8 is a schematic cross-sectional view taken in direction 8—8 of FIGS. 1 and 6 showing a harmonic drive mechanism of the electric generators of FIGS. 1 and 6.

DETAILED DESCRIPTION OF A PREFERRED EMBODIMENT

Figure 1:
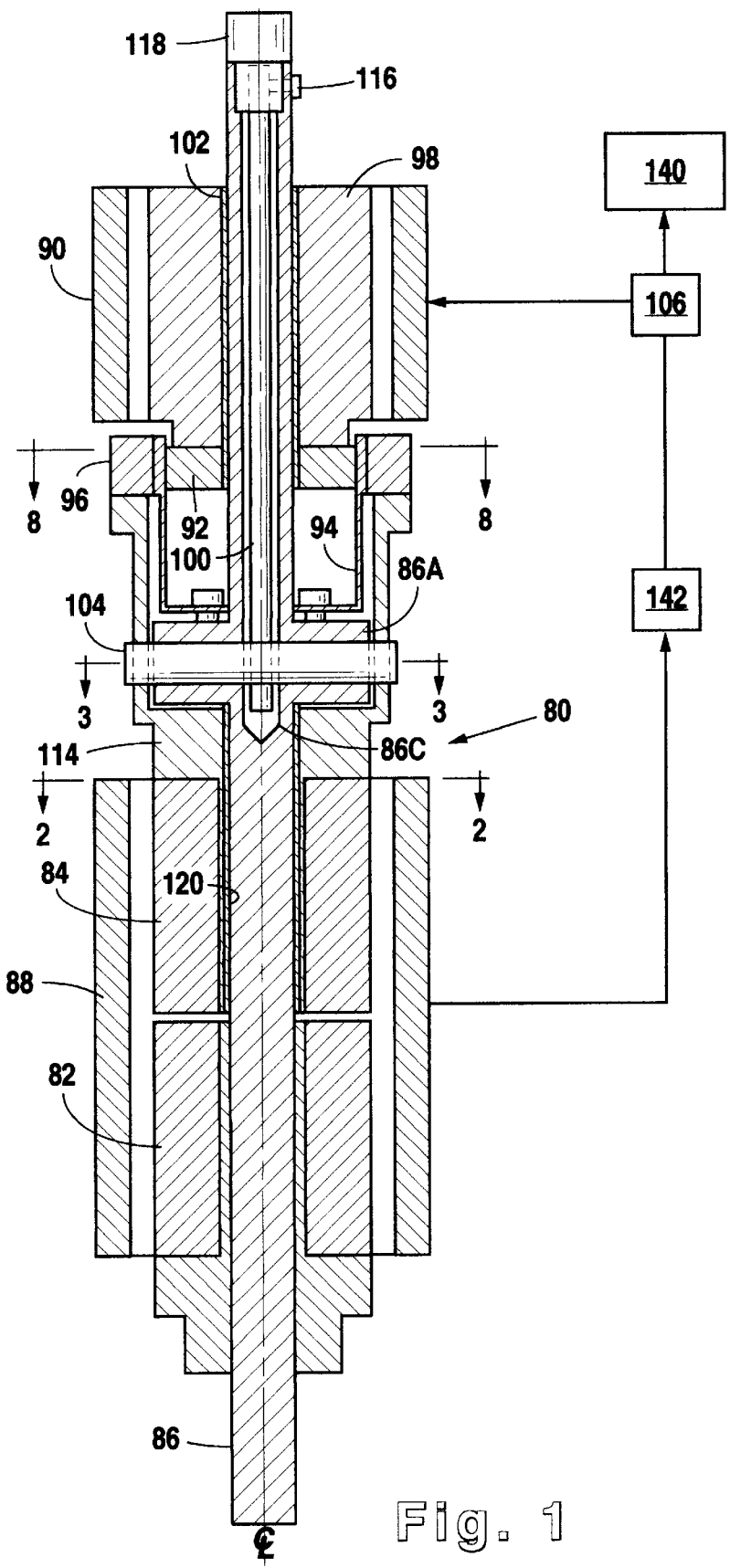
FIG. 1 is a schematic axial cross-sectional view of an electric generator in accordance with the present invention.

FIG. 1 illustrates an electric generator 80 in accordance with the present invention for supplying electrical energy to a downhole system 140. Electric generator 80 is driven by a drive shaft 86 that is preferably connected to a conventional mud-powered turbine (not shown) and supported by bearings (not shown). Electric generator 80 comprises permanent magnets 82 and 84, which are preferably of equal length and magnetic strength and which rotate inside a fixed main armature 88 to generate downhole electric energy. Because such electric energy is needed over a wide range of rotation speeds of drive shaft 86 (i.e., the mud-powered turbine) and electrical demands of system 140, the electrical output must be controlled. The present invention controls the electrical output by providing a regulator for varying the relative rotational position of movable magnet 84 with respect to fixed magnet 82. Specifically, fixed magnet 82 is fixedly attached to drive shaft 86, but movable magnet 84 is mounted to a carriage 114 that is mounted to drive shaft 86 with a bearing 120 such that carriage 114 may rotate with respect to drive shaft 86. The degree of relative rotation between carriage 114 and drive shaft 86 is preferably limited by a stop pin 104 as discussed below.

Figure 9:
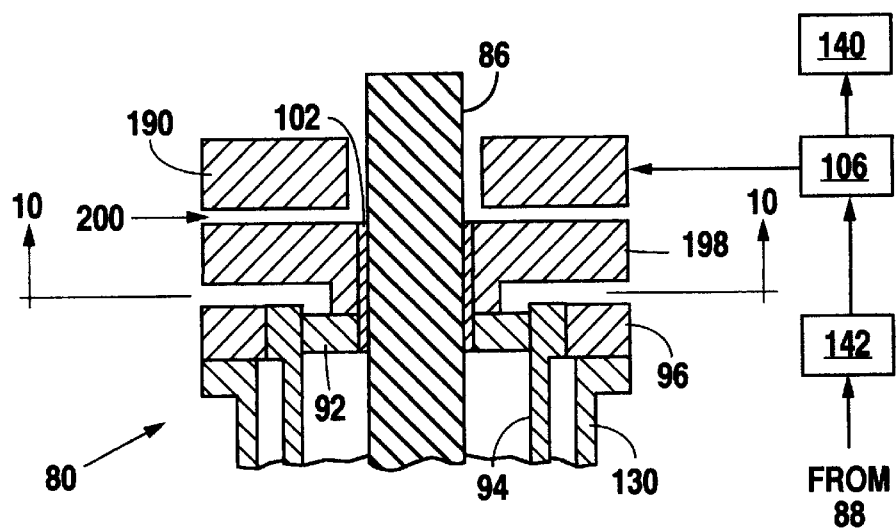
FIG. 9 is a schematic axial cross-sectional view of an alternative embodiment of an electric generator in accordance with the present invention.

As will be readily apparent to persons skilled in the art, the present invention may be used to generate AC or DC electrical energy. If this invention is used to generate DC electrical energy, a rectifier 142 is provided as shown in FIG. 1 to rectify the output from main armature 88 before it is fed into controller 106 and on to system 140. Similar arrangements are shown in FIGS. 6 and 9 for alternative embodiments of this invention.

Figure 2:
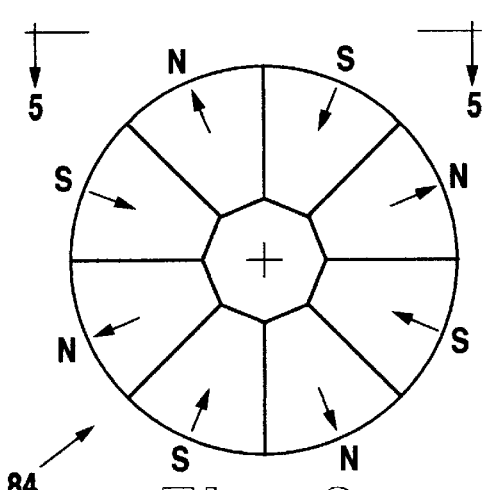
FIG. 2 is a schematic cross-sectional view taken in direction 2—2 of FIG. 1 showing a movable magnet of the electric generator of FIG. 1.
Figure 3:
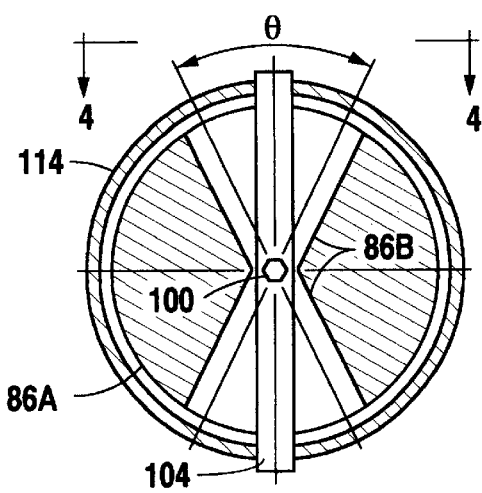
FIG. 3 is a schematic cross-sectional view taken in direction 3—3 of FIG. 1 showing a stop pin and cooperating structure of the electric generator of FIG. 1.
Figure 4:
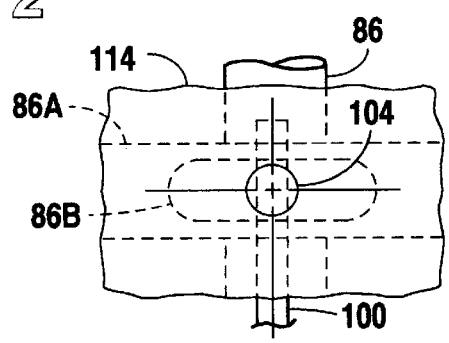
FIG. 4 is a schematic elevational view taken in direction 4—4 of FIG. 3 showing a stop pin and cooperating structure of the electric generator of FIG. 1.
Figure 5A:
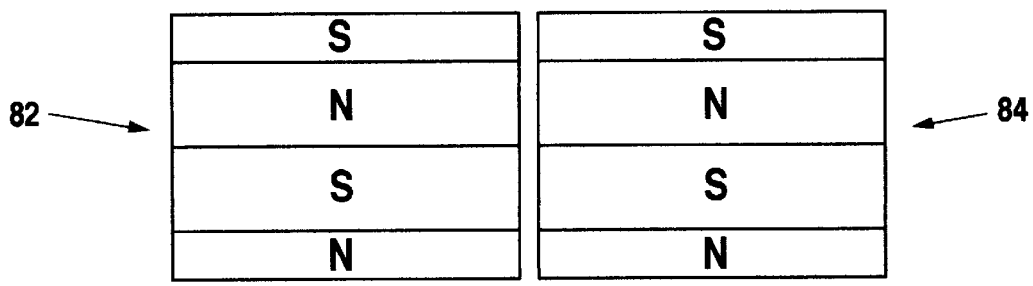
FIGS. 5A and 5B are schematic elevational views taken in direction 5—5 of FIG. 2 showing two different relative positions of fixed and movable magnets of the electric generator of FIG. 1.
Figure 5B:
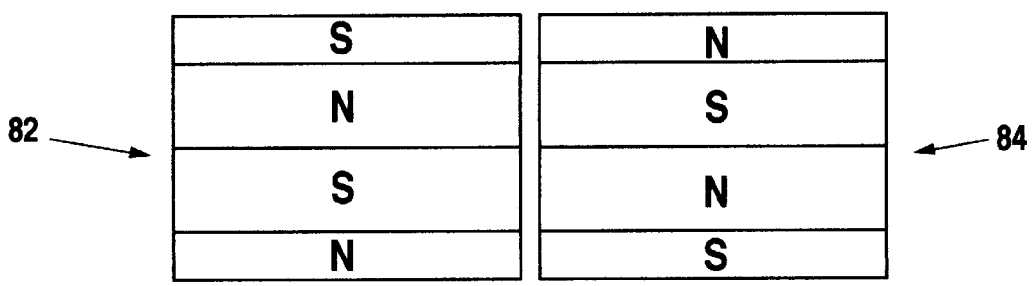

As shown in FIGS. 2, 5A, and 5B (in which main armature 88, carriage 114, bearing 120, and drive shaft 86 are not shown for clarity), magnets 82 and 84 comprise a plurality of longitudinal permanent magnet segments, which are preferably bonded to carriage 114. The magnetization of the magnet segments alternates circumferentially from north pointing radially outward to north pointing radially inward. When magnets 82 and 84 are completely aligned as shown in FIG. 5A, the maximum electrical output will be generated. Conversely, when magnets 82 and 84 are completely misaligned as shown in FIG. 5B, zero electrical output will be generated. For the preferred embodiment shown, this range of movement is 45° (angle θ in FIG. 3). Thus, the requisite amount of electrical output is achieved by positioning magnets 82 and 84 between these two extremes. As shown in FIGS. 1, 3, and 4, a preferred embodiment limits this range of motion to the appropriate degree by means of a stop pin 104 that rotates within a transverse cavity in the form of a pair of symmetric sectors 86B within an enlarged portion 86A of drive shaft 86. A biasing element 100, preferably of hexagonal cross-section, is installed through an axial cavity 86C in one end of drive shaft 86 and into a matching, preferably hexagonal, shaped hole in stop pin 104. Biasing element 100 serves to bias carriage 114 and movable magnet 84 in the maximum-output position with stop pin 104 against one extreme of sectors 86B. This biasing effect is accomplished by applying a torsional preload on biasing element 100 in the direction of the rotation of drive shaft 86 and securing biasing element 100 in the preloaded position with a set screw 116 contained in an end fitting 118. Stop pin 104 protrudes through a hole in carriage 114 and thereby rotates with carriage 114 when carriage 114 is rotated by a drag torque, as discussed below. After carriage 114 has been rotated from its initial position with respect to drive shaft 86 by means of a drag torque as discussed below, stop pin 104 serves to return carriage 114 to its initial position by means of biasing element 100.

Persons skilled in the art will recognize that the hexagonal shape of biasing element 100 and the corresponding hole in stop pin 104 are simply a convenient means of fastening biasing element 100 to stop pin 104 using a segment of a conventional hex key (Allen wrench). In general, the shape need not be hexagonal so long as another means of fastening biasing element 100 to stop pin 104 is provided. Furthermore, the means of biasing carriage 114 and movable magnet 84 toward a certain position could take a variety of other forms, such as a coil spring. Moreover, the biasing mechanism could be located outside rather than inside drive shaft 86 if, for instance, electrical wires need to be routed through the inside of drive shaft 86. Also, although a preferred embodiment comprises a biasing mechanism, a biasing mechanism is not absolutely necessary for all applications and could be eliminated, if desired.

Figure 12:
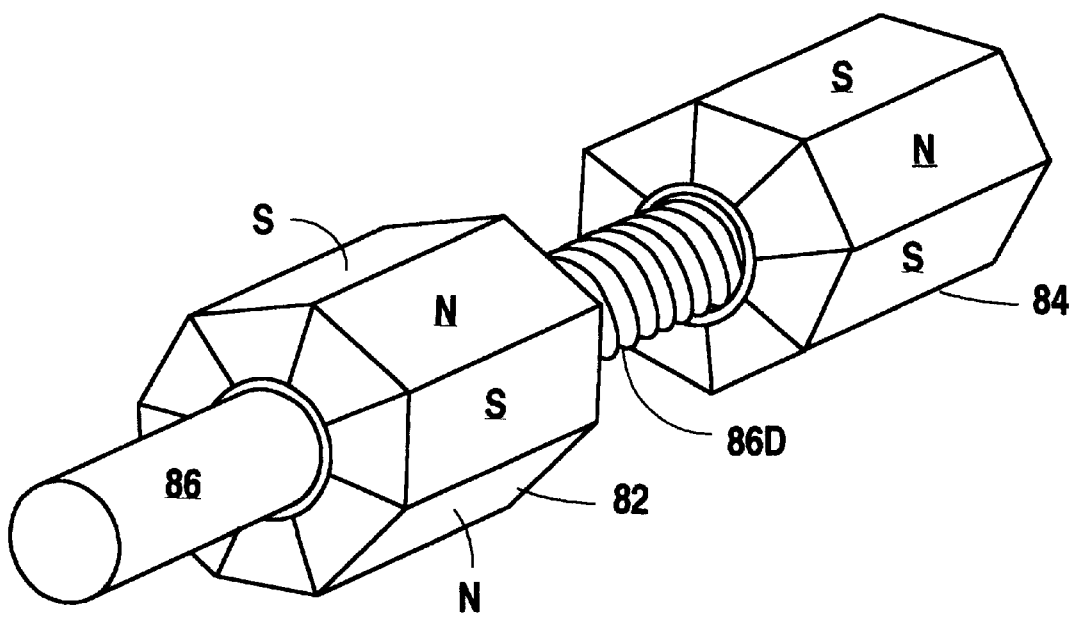
FIG. 12 is a schematic perspective view of fixed and movable magnets of an alternative embodiment of an electric generator in accordance with the present invention.

Persons skilled in the art will also recognize that the configuration of magnets 82 and 84 and the relative rotation limiting device for varying the amount of electrical output generated by an embodiment of this invention may take a variety of other forms. For example, the relative rotation may be limited to less than that which would be required to achieve complete misalignment of magnets 82 and 84 such that the maximum allowable rotation produces a certain fraction of maximum output instead of zero output. Alternatively, magnets 82 and 84 may be made of unequal axial length such that rotation into the completely misaligned position produces a certain fraction of maximum output instead of zero output. Additionally, the number of magnet segments comprising magnets 82 and 84 may be varied such that a rotation angle other than 45° is required to achieve complete misalignment. As shown in FIG. 2, the cross-sections of magnets 82 and 84 preferably have a circular outer shape and a polygonal inner shape. A circular outer shape is preferable for providing an optimal magnetic field to cooperate with main armature 88, and a polygonal inner shape is preferable for ease of manufacture and to help prevent the magnet segments from de-bonding from carriage 114 due to torsional loads. However, the outer and inner shapes of magnets 82 and 84 may comprise other suitable shapes, as will be readily recognized by persons skilled in the art. For example, as illustrated in FIG. 12, the outer cross-sectional shape of magnets 82 and 84 may be polygonal and the inner cross-sectional shape may be circular. Because magnets 82 and 84 may be of polygonal cross-section or circular cross-section, the term "circumferential" as used herein to describe magnets 82 and 84 should be understood to mean the peripheral dimension of those elements, whether flat or curved. Also, although the magnet segments comprising magnets 82 and 84 are preferably of equal circumferential dimensions, they may be of unequal circumferential dimensions, if desired.

Further, the regulator for varying the position of movable magnet 84 with respect to fixed magnet 82 may take a variety of forms. Referring to FIG. 1, a preferred regulator comprises a drag element 98 mounted to a bearing 102 on drive shaft 86. Drag element 98, which rotates inside a fixed drag armature 90, is preferably made of copper and serves as a path for developing an eddy current. It should be understood that copper is referred to as a preferred material for certain elements of this invention, but any suitable conductive material could be used in place of copper for such elements. In typical downhole operations, fluctuations in parameters such as input RPM, electrical demands of system 140, and ambient temperature tend to cause fluctuations in the electrical output from main armature 88. Therefore, a preferred regulator includes a controller 106 which contains suitable electronics for monitoring the electrical output from main armature 88 and making appropriate adjustments to the input to drag armature 90, as discussed below, to modify the electrical output from main armature 88 and thereby meet the electrical requirements of system 140. Specifically, controller 106 generates an appropriate electrical control current in the windings of drag armature 90, which sets up a first magnetic field. The rotation of drag element 98 within the first magnetic field creates an eddy current in drag element 98, which is a function of (1) the magnetic field created by drag armature 90, (2) the speed of rotation of drag element 98, (3) the conductivity of drag element 98, and (4) the axial length of drag element 98. In turn, the eddy current in drag element 98 produces a second magnetic field that opposes the first magnetic field, which creates a drag torque on drag element 98. Thus, drag element 98 (rotor) and drag armature 90 (stator) function as a drag torque generator. The drag torque causes drag element 98 to rotate relative to drive shaft 86 in the direction opposite that of the drive shaft rotation. Because drag element 98 is connected to movable magnet 84 through a torque converter as discussed below, the drag torque rotates movable magnet 84 relative to fixed magnet 82 by an appropriate amount according to the applied electrical control current. The relative movement of movable magnet 84 with respect to fixed magnet 82 modifies the electrical output from main armature 88. Thus, as controller 106 senses deviations in the output from main armature 88, controller 106 makes appropriate modifications to the electrical control current in drag armature 90 to cause appropriate modifications to the output from main armature 88 and thereby meet the electrical requirements of system 140.

Figure 13:
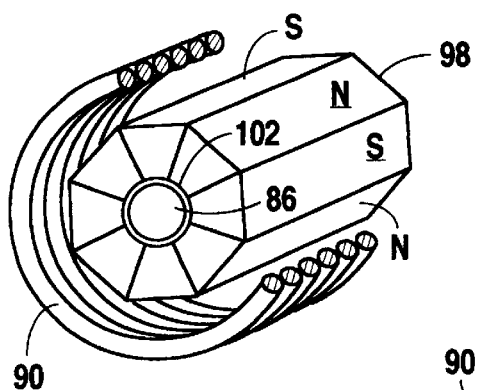
FIG. 13 is a schematic perspective view of an alternative drag element and drag armature in accordance with the present invention.

Persons reasonably skilled in the art will recognize that the required drag torque may be generated by a variety of other rotor/stator configurations, such as: (1) a copper drag element rotating inside permanent magnets housed in a fixed armature; (2) permanent magnets rotating inside a fixed copper cylinder; (3) a copper drag element rotating inside a motor-driven, rotatable drag armature comprising a series of alternately magnetized permanent magnet segments, similar to magnets 82 and 84 as shown in FIG. 2, which can be rotated in either direction to advance or retard the drag element, as appropriate; or (4) a drag element, comprising a series of alternately magnetized permanent magnet segments similar to magnets 82 and 84 as shown in FIG. 2, rotating within a stator comprising windings which can be energized to control the speed and direction of a rotating magnetic field and thus advance or retard the drag element, as appropriate. The latter configuration of a drag torque generator is illustrated only a portion of drag armature 90 is shown for the sake of clarity. As seen in FIG. 13, drag element 98, which is rotatably mounted on drive shaft 86 by way of bearing 102, may comprise a plurality of longitudinal permanent magnetic segments having magnetizations circumferentially alternating between north pointing inward toward the axis of drive shaft 86 and north pointing outward away from the axis of drive shaft 86, and drag armature 90 may comprise windings which surround drag element 98. By appropriately varying the current in the windings of drag armature 90, the resulting magnetic field may be made to rotate in such a manner as to advance or retard drag element 98, as desired. The foregoing options (1) and (2) would not include a controller 106 and therefore would not be responsive to the output from main armature 88; rather, those two open-loop options would be responsive only to changes in drive shaft speed and would simply limit the output from main armature 88. By contrast, the latter two options (3) and (4) would provide an additional advantage of helping to reduce the time that the apparatus takes to return to the initial, maximum-output position by enabling the application of a "reverse" drag torque (i.e., a torque in the same direction as the rotation of drive shaft 86) to drag element 98, thereby assisting biasing element 100 in moving carriage 114 and movable magnet 84 back to their initial position. If desired, option (1) or (2) could be used in conjunction with the other drag torque generator configurations described herein to provide both a rudimentary limit to the output and a more sophisticated output control mechanism. The rudimentary limit provided by option (1) or (2) in such a hybrid configuration may be desirable, for example, to prevent an electrical overload in the event of failure of the electronics in controller 106. Of course, the drag torque could also be supplied by a mechanical brake.

Figure 10:
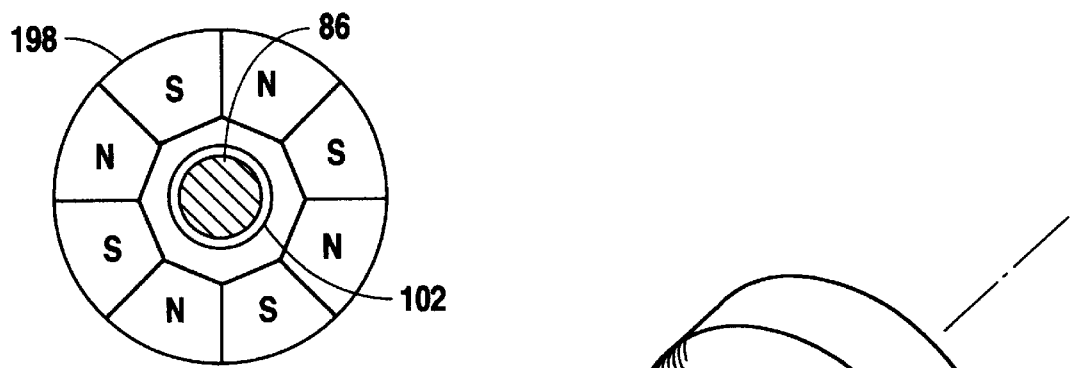
FIG. 10 is a schematic cross-sectional view taken in direction 10—10 of FIG. 9 showing an alternative drag element of the electric generator of FIG. 9.
Figure 11:
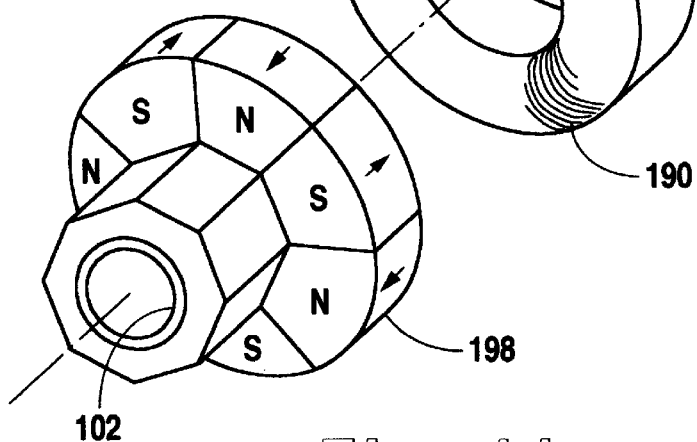
FIG. 11 is a schematic exploded perspective view of a drag element and drag armature of the electric generator of FIG. 9.

In the above-described configurations for drag element 98 and drag armature 90, the drag torque is supplied by the interaction of opposing magnetic fields formed around the circumference of drag element 98 (referred to hereafter as "circumferential configurations"). However, it should also be understood that the drag torque could be supplied by the interaction of opposing magnetic fields formed in a plane normal to the longitudinal axis of drive shaft 86 (referred to hereafter as "axial configurations"). Referring to FIG. 9, in an axial configuration, a disc-like drag element 198 would replace drag element 98 from a circumferential configuration, and a disc-like drag armature 190 would replace drag armature 90. Thus, the opposing magnetic fields would be formed in region 200 between drag element 198 and drag armature 190. Appropriate selections for drag element 198 and drag armature 190 would therefore create axial configuration counterparts to any of the above-described circumferential configurations. Specifically, axial configurations could comprise: (1) a copper drag element rotating adjacent to a fixed drag armature having windings for carrying electrical current to induce an eddy current in the copper drag element; (2) a copper drag element rotating adjacent to a fixed drag armature comprising permanent magnets for inducing an eddy current in the copper drag element; (3) a drag element comprising permanent magnets rotating adjacent to a fixed copper drag armature for carrying an eddy current induced by the rotating permanent magnets of the drag element; (4) a copper drag element rotating adjacent to a motor-driven, rotatable drag armature comprising a series of alternately magnetized permanent magnets, similar to those shown in FIG. 10, for inducing an eddy current in the drag element and which can be rotated in either direction to advance or retard the drag element, as appropriate; or (5) a drag element, comprising a series of alternately magnetized permanent magnets as shown in FIG. 10, rotating adjacent to a fixed drag armature comprising windings which can be energized to control the speed and direction of a rotating magnetic field to interact with the magnetic field of the magnets on the drag element and thus advance or retard the drag element, as appropriate. As an example, FIGS. 9, 10, and 11 illustrate the cooperation of drag element 198 and drag armature 190 for the above-described axial configuration (5). In FIG. 11, drive shaft 86 is not shown for clarity. Also, for the sake of clarity, FIGS. 10 and 11 do not show a backing plate that is preferably of high magnetic permeability and is preferably bonded to the magnets of drag element 198 on the face of the magnets that is not adjacent to drag armature 190 (i.e., the face of the magnets that is visible in FIGS. 10 and 11). Such a backing plate, which is preferably machined as an integral part of the polygonal core of drag element 198, serves to more adequately complete the magnetic circuit of the magnets of drag element 198 and also serves as an extra means of attachment to prevent the magnets from flying off the core due to centrifugal forces of rotation.

To achieve the desired movement of carriage 114 with as small a drag torque as possible, the drag torque generated on drag element 98 is preferably multiplied using a torque converter as it is transmitted to carriage 114. In a preferred embodiment, the torque converter comprises a harmonic drive mechanism such as those sold by Harmonic Drive Technologies, Inc. and HD Systems, Inc. Alternatively, the torque converter could comprise other known gear mechanisms, such as a planetary gear mechanism. Although it may be possible to eliminate the torque converter in certain embodiments of this invention, the absence of a torque converter would increase the input torque requirements to unacceptable levels in most instances.

As shown in FIGS. 1 and 8, a preferred harmonic drive mechanism comprises a wave generator 92, a flexspline 94, and a circular spline 96. Drag element 98 is fixedly connected to wave generator 92, and circular spline 96 is fixedly connected to carriage 114 which comprises movable magnet 84. Circular spline 96 is relatively stiff and has internal teeth to engage flexspline 94. Flexspline 94, which is of slightly smaller diameter than circular spline 96 and has fewer teeth (usually two fewer) than circular spline 96, is relatively flexible and has external teeth to engage circular spline 96. Wave generator 92 comprises an elliptical, thin raced ball bearing that fits inside flexspline 94 and causes flexspline 94 to engage circular spline 96 at each end of the major axis of the ellipse. Wave generator 92, flexspline 94, and circular spline 96 cooperate such that each revolution of wave generator 92 causes circular spline 96 to rotate by only two teeth, for example. Thus, the drag torque on drag element 98 is multiplied as transmitted to carriage 114 and movable magnet 84 as a control torque. A tradeoff for achieving this torque multiplication is that the harmonic drive mechanism increases the response time of the apparatus. However, if desired, the use of a motor-driven, rotatable drag armature as mentioned above would help to decrease the response time.

Figure 14:
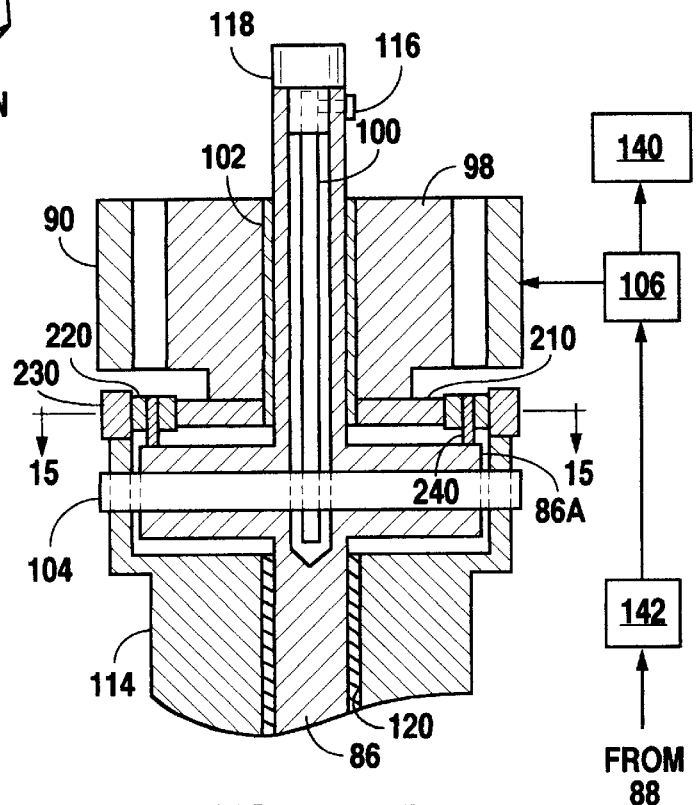
FIG. 14 is a schematic axial cross-sectional view of yet another alternative embodiment of an electric generator in accordance with the present invention.
Figure 15:
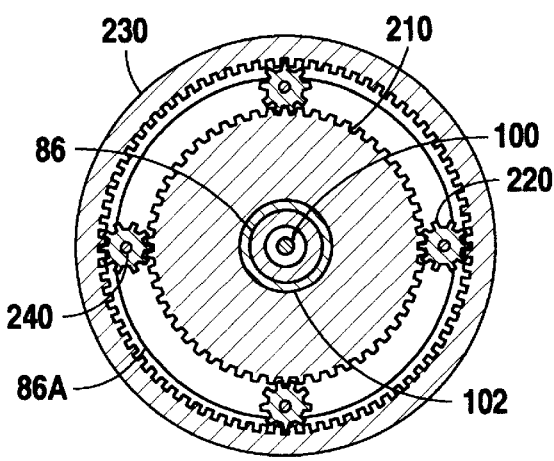
FIG. 15 is a schematic cross-sectional view taken in direction 15—15 of FIG. 14 showing a planetary gear mechanism of the electric generator of FIG. 14.

FIGS. 14 and 15 illustrate an alternative embodiment of the present invention having a planetary gear mechanism as a torque converter in place of a harmonic drive mechanism as in FIG. 1. In this alternative embodiment, drag element 98 is firmly attached to a sun gear 210, which is also rotatably mounted to bearing 102. One or more planet gears 220 are mounted to enlarged portion 86A of drive shaft 86 using gear mounts 240, and a ring gear 230 is firmly attached to carriage 114. Planet gears 220 are engaged with both sun gear 210 and ring gear 230. As drag element 98 rotates with respect to drive shaft 86, sun gear 210 causes planet gears 220 to rotate in the opposite direction as drag element 98, which in turn causes ring gear 230 (and consequently carriage 114 and movable magnet 84) to rotate in the opposite direction as drag element 98. As with the harmonic drive mechanism of FIG. 1, by selecting the appropriate nominal diameters and numbers of teeth for sun gear 210, planet gears 220, and ring gear 230, the drag torque on drag element 98 is appropriately multiplied as it is transmitted to carriage 114 such that movable magnet 84 is rotated by the desired amount with respect to fixed magnet 82.

Because power generator 80 comprises a brushless, non-contact apparatus, it has an additional advantage of being capable of operating while immersed in oil. Thus, if oil is needed for pressure balancing due to high downhole pressures, this generator can safely operate in an oil-filled compartment.

Persons skilled in the art will recognize that other advantageous configurations are possible to vary the amount of electrical output generated by an embodiment of this invention. For example, referring to FIG. 6, circular spline 96 could be fixedly attached to a spline mounting 130, which is fixedly attached to drive shaft 86. In this alternative configuration, flexible spline 94 is rotatably mounted on drive shaft 86 with a bearing 122. Flexible spline 94 is fixedly connected to carriage 114 with guide pins 124, which extend through clearance guide slots 130A in spline mounting 130, as shown in FIG. 7. The biasing mechanism in this alternative configuration preferably comprises springs 126 fastened to guide pins 124 and bias pins 128, which protrude from spline mounting 130. Drag element 98 and wave generator 92 are configured in the same manner as in FIG. 1. However, in the configuration of FIG. 6, the direction of the harmonic drive output is reversed from that of FIG. 1 such that the control torque is in the direction of rotation of drive shaft 86. Springs 126 and bias pins 128 are therefore configured to bias movable magnet 84 in the direction opposite the rotation of drive shaft 86. Thus, through conversion into an opposite control torque, the drag torque on drag element 98 operates to decrease the generated electrical output by misaligning magnets 82 and 84 in the opposite direction as that described above for the configuration of FIG. 1. Additionally, the reactive torque produced by the generated electrical output would help to decrease the response time required to return to the initial, maximum-output position.

Yet another advantageous configuration may be to fix the initial relationship of magnets 82 and 84 in a certain degree of misalignment such that the default electrical output is somewhat less than the maximum possible output. Indeed, it may be beneficial in certain applications to have an initial relationship of complete misalignment of magnets 82 and 84 such that the initial electrical output is zero. By selecting the proper arrangement of the harmonic drive output direction and the direction of the biasing torque, the drag torque could be made to increase or decrease the electrical output, as desired. However, in a preferred embodiment of this invention, controller 106 is powered by a portion of the output from main armature 88. Therefore, an initial relationship of complete misalignment of magnets 82 and 84 which produces zero initial output generally would not be desirable unless an alternate power source is provided for controller 106.

As shown in FIG. 12, another advantageous configuration may be to have a threaded cooperation of movable magnet 84 on threads 860 of drive shaft 86 such that the drag torque created on drag element 98 translates movable magnet 84 axially and thereby changes the electrical output by changing the percentage of movable magnet 84 that is encompassed by main armature 88. Such a threaded configuration would also vary the electrical output by changing the separation distance between fixed magnet 82 and movable magnet 84.

Because the present invention is intended to be able to operate at elevated downhole temperatures, the various magnets referred to herein preferably comprise samarium-cobalt (Sm—Co) magnets. Although some other types of magnets, such as neodymium-iron-boron (Nd—Fe—B) magnets, generally provide better magnetic flux at lower temperatures, Sm—Co magnets maintain better energy density at temperatures above about 150° C. However, any suitable type of magnets may be used, if desired.

Although the foregoing specific details describe a preferred embodiment of this invention, persons reasonably skilled in the art of electric power generation for petroleum well drilling and logging will recognize that various changes may be made in the details of the apparatus of this invention without departing from the spirit and scope of the invention as defined in the appended claims. Therefore, it should be understood that this invention is not to be limited to the specific details shown and described herein.

I claim:

1. An apparatus for generating variable downhole electrical energy from a rotating shaft, comprising:

a drive shaft having a longitudinal drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a second permanent magnet movably mounted on said drive shaft axially adjacent to said first permanent magnet and comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said second permanent magnet for regulating said electrical output by varying the position of said second permanent magnet with respect to said first permanent magnet;

wherein said regulator may vary the axial separation of said second permanent magnet with respect to said first permanent magnet between a first relative position for which said electrical output is a minimum value and a second relative position for which said electrical output is a maximum value.

2. An apparatus for generating variable downhole electrical energy from a rotating shaft, comprising:

a drive shaft having a longitudinal drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a second permanent magnet movably mounted on said drive shaft axially adjacent to said first permanent magnet and comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said second permanent magnet for regulating said electrical output by varying the position of said second permanent magnet with respect to said first permanent magnet;

wherein said regulator may vary the rotational alignment and the axial separation of said second permanent magnet with respect to said first permanent magnet between a first relative position for which said electrical output is a minimum value and a second relative position for which said electrical output is a maximum value.

3. The apparatus of any one of claims 1, and 2 wherein said minimum value is greater than zero.

4. An apparatus for generating variable downhole electric energy from a rotating shaft for a downhole system, comprising:

a drive shaft having a longitudinal drive shaft axis, said drive shaft having a first end and a second end along said drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a carriage rotatably mounted on said drive shaft axially adjacent to said first permanent magnet and comprising a second permanent magnet comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said carriage and comprising a drag torque generator for generating a drag torque on said carriage in the direction opposite the rotation of said drive shaft thereby regulating said electrical output by varying the rotational alignment of said second permanent magnet with respect to said first permanent magnet;

wherein said regulator further comprises an electronic controller operably connected to said main armature, said drag torque generator, and said downhole system for monitoring said electrical output, comparing said electrical output to the electrical requirements of said downhole system, and sending control signals to said drag torque generator to modify said electrical output to match the electrical requirements of said downhole system;

wherein said drag torque generator comprises (a) a drag element rotatably mounted to said drive shaft and operably connected to said carriage, said drag element comprising a third plurality of longitudinal permanent magnetic segments having magnetizations circumferentially alternating between north pointing inward toward said drive shaft axis and north pointing outward away from said drive shaft axis for creating a first magnetic field and (b) a fixed drag armature surrounding at least a portion of said drag element and having windings for carrying an electrical control current in response to said control signals from said controller; and wherein said electrical control current creates a second, rotating magnetic field opposed to said first magnetic field thereby generating said drag torque.

5. The apparatus of claim 4 wherein said second, rotating magnetic field is capable of rotation in such a manner as to create a reverse drag torque.

6. An apparatus for generating variable downhole electric energy from a rotating shaft for a downhole system, comprising:

a drive shaft having a longitudinal drive shaft axis, said drive shaft having a first end and a second end along said drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a carriage rotatable mounted on said drive shaft axially adjacent to said first permanent magnet and comprising a second permanent magnet comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said carriage and comprising a drag torque generator for generating a drag torque on said carriage in the direction opposite the rotation of said drive shaft thereby regulating said electrical output by varying the rotational alignment of said second permanent magnet with respect to said first permanent magnet;

wherein said regulator further comprises an electronic controller operably connected to said main armature, said drag torque generator, and said downhole system for monitoring said electrical output, comparing said electrical output to the electrical requirements of said downhole system, and sending control signals to said drag torque generator to modify said electrical output to match the electrical requirements of said downhole system;

wherein said drag torque generator comprises (a) a drag element rotatably mounted to said drive shaft and operably connected to said carriage, said drag element comprising a third plurality of permanent magnetic segments having magnetizations circumferentially alternating between north pointing toward said first end of said drive shaft and north pointing toward said second end of said drive shaft for creating a first magnetic field and (b) a fixed drag armature axially adjacent to said drag element and having windings for carrying an electrical control current in response to said control signals from said controller; and wherein said electrical control current creates a second, rotating magnetic field opposed to said first magnetic field thereby generating said drag torque.

7. The apparatus of claim 6 wherein said second, rotating magnetic field is capable of rotation in such a manner as to create a reverse drag torque.

8. An apparatus for generating variable downhole electric energy from a rotating shaft for a downhole system, comprising:

a drive shaft having a longitudinal drive shaft axis, said drive shaft having a first end and a second end along said drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a carriage rotatably mounted on said drive shaft axially adjacent to said first permanent magnet and comprising a second permanent magnet comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said carriage and comprising a drag torque generator for generating a drag torque on said carriage in the direction opposite the rotation of said drive shaft thereby regulating said electrical output by varying the rotational alignment of said second permanent magnet with respect to said first permanent magnet;

wherein said regulator further comprises a torque converter operably connected to said drag torque generator and said carriage for converting said drag torque to a control torque and transferring said control torque to said carriage.

9. The apparatus of claim 8 wherein said torque converter comprises a harmonic drive mechanism.

10. The apparatus of claim 9 wherein said harmonic drive mechanism comprises:

a circular spline fixedly mounted to said carriage and having a plurality of internal teeth;

a flexspline fixedly mounted to said drive shaft and having a plurality of external teeth for engaging said plurality of internal teeth of said circular spline, with said plurality of external teeth being fewer than said plurality of internal teeth; and a wave generator fixedly mounted to said drag torque generator and having an elliptical, thin raced ball bearing operatively engaged inside said flexspline such that said external teeth of said flexspline engage said internal teeth of said circular spline at each end of the major axis of said elliptical bearing; and wherein said wave generator, flexspline, and circular spline cooperate such that each revolution of said wave generator causes said circular spline and said carriage to rotate by only a fraction of a revolution.

11. The apparatus of claim 9 wherein said harmonic drive mechanism comprises:

a spline mounting fixedly mounted to said drive shaft and having at least one guide slot;

a circular spline fixedly mounted to said spline mounting and having a plurality of internal teeth;

a flexspline rotatably mounted to said drive shaft and having a plurality of external teeth for engaging said plurality of internal teeth of said circular spline, with said plurality of external teeth being fewer than said plurality of internal teeth;

a wave generator fixedly mounted to said drag torque generator and having an elliptical, thin raced ball bearing operatively engaged inside said flexspline such that said external teeth of said flexspline engage said internal teeth of said circular spline at each end of the major axis of said elliptical bearing; and at least one guide pin fixedly attached to said flexspline and freely passing through said at least one guide slot in said spline mounting and fixedly attached to said carriage;

wherein said wave generator, flexspline, and circular spline cooperate such that each revolution of said wave generator causes said flexspline and said carriage to rotate by only a fraction of a revolution.

12. The apparatus of claim 11 wherein said spline mounting further comprises at least one bias pin and wherein said apparatus further comprises a biasing mechanism comprising at least one spring respectively connecting said at least one bias pin to said at least one guide pin.

13. The apparatus of claim 8 wherein said torque converter comprises a planetary gear mechanism.

14. An apparatus for generating variable downhole electric energy from a rotating shaft for a downhole system, comprising:

a drive shaft having a longitudinal drive shaft axis, said drive shaft having a first end and a second end along said drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a carriage rotatably mounted on said drive shaft axially adjacent to said first permanent magnet and comprising a second permanent magnet comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said carriage and comprising a drag torque generator for generating a drag torque on said carriage in the direction opposite the rotation of said drive shaft thereby regulating said electrical output by varying the rotational alignment of said second permanent magnet with respect to said first permanent magnet;

wherein said regulator may vary the rotational alignment of said second permanent magnet with respect to said first permanent magnet between a first relative position for which said electrical output is a minimum value and a second relative position for which said electrical output is a maximum value; and wherein said minimum value is greater than zero.

15. An apparatus for generating variable downhole electric energy from a rotating shaft for a downhole system, comprising:

a drive shaft having a longitudinal drive shaft axis, said drive shaft having a first end and a second end along said drive shaft axis;

a first permanent magnet fixedly attached to said drive shaft and comprising a first plurality of longitudinal permanent magnetic segments having magnetizations circumferentially alternating between north pointing inward toward said drive shaft axis and north pointing outward away from said drive shaft axis;

a carriage rotatably mounted on said drive shaft axially adjacent to said first permanent magnet and comprising a second permanent magnet comprising a second plurality of longitudinal permanent magnetic segments having magnetizations circumferentially alternating between north pointing inward toward said drive shaft axis and north pointing outward away from said drive shaft axis;

a main armature surrounding at least a portion of each of said first and second permanent magnets and having windings for generating electrical output due to the rotation of said first and second permanent magnets within said main armature; and a regulator operably connected to said carriage and comprising a drag torque generator for generating a drag torque on said carriage in the direction opposite the rotation of said drive shaft thereby regulating said electrical output by varying the rotational alignment of said second permanent magnet with respect to said first permanent magnet;

wherein said regulator may vary the rotational alignment of said second permanent magnet with respect to said first permanent magnet between a first relative position for which said electrical output is a minimum value and a second relative position for which said electrical output is a maximum value; and further comprising a biasing mechanism for biasing said second permanent magnet toward said second relative position.

16. The apparatus of claim 15 wherein:

said drive shaft has an axial cavity and a transverse cavity intersecting said axial cavity; and said biasing mechanism comprises (a) a stop pin disposed within said transverse cavity and operably connected to said carriage, (b) a longitudinal biasing element disposed within said axial cavity and operably connected to said stop pin, and (c) a means for applying a torsional preload to said biasing element such that said stop pin tends to engage a portion of the boundary of said transverse cavity.

17. The apparatus of claim 15 wherein said biasing mechanism comprises a spring connecting said drive shaft to said carriage.

* * * * *